(12) United States Patent
Kim et al.

(10) Patent No.: US 12,501,204 B2
(45) Date of Patent: Dec. 16, 2025

(54) ELECTRONIC DEVICE INCLUDING PIPELINE STRUCTURE THROUGH WHICH SOUND PROPAGATES

(71) Applicant: Samsung Electronics Co., Ltd., Suwon-si (KR)

(72) Inventors: Taeeon Kim, Suwon-si (KR); Kiwon Kim, Suwon-si (KR); Seongkwan Yang, Suwon-si (KR); Myungcheol Lee, Suwon-si (KR); Joonrae Cho, Suwon-si (KR); Seungnam Kim, Suwon-si (KR); Taewoo Kim, Suwon-si (KR); Jaehee You, Suwon-si (KR); Kwanhee Han, Suwon-si (KR); Seungyoon Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 18/322,160

(22) Filed: May 23, 2023

(65) Prior Publication Data
US 2023/0300520 A1    Sep. 21, 2023

Related U.S. Application Data

(63) Continuation of application No. PCT/KR2022/000528, filed on Jan. 12, 2022.

(30) Foreign Application Priority Data

Jan. 12, 2021   (KR) .................. 10-2021-0004253

(51) Int. Cl.
*H04R 1/28*    (2006.01)
*H04M 1/02*    (2006.01)
*H04R 1/02*    (2006.01)

(52) U.S. Cl.
CPC .......... *H04R 1/2857* (2013.01); *H04M 1/026* (2013.01); *H04R 1/028* (2013.01);
(Continued)

(58) Field of Classification Search
CPC ...... H04R 1/2857; H04R 1/026; H04R 1/028; H04R 1/288; H04R 2499/11;
(Continued)

(56) References Cited

U.S. PATENT DOCUMENTS 5,197,103 A    3/1993   Hayakawa
6,771,787 B1   8/2004   Hoefler et al.
(Continued)

FOREIGN PATENT DOCUMENTS

CN    109743418 A      5/2019
JP    2013239788 A    11/2013
(Continued)

OTHER PUBLICATIONS

International Search Report dated Apr. 26, 2022, issued in International Patent Application No. PCT/KR2022/000528.
(Continued)

*Primary Examiner* — Jason R Kurr
(74) *Attorney, Agent, or Firm* — Jefferson IP Law, LLP

(57) ABSTRACT

An electronic device is provided. The electronic device includes a housing including a front plate, a rear plate disposed to be spaced a predetermined distance apart from the front plate in parallel, and a side plate surrounding a space formed between the front plate and the rear plate, an opening disposed between an upper edge of the front plate and the side plate, a speaker including a sound radiation part in a direction of being directed toward the front plate and disposed inside the housing, a support member disposed to extend from the sound radiation part toward the upper edge of the front plate, and a pipeline including a space formed (Continued)

between the front plate and the support member. The pipeline may include a first structure disposed adjacent to the sound radiation part and a second structure disposed adjacent to the opening, and the second structure may be disposed to be spaced a predetermined length apart from the first structure in a direction of forming an acute angle with respect to a reference line orthogonal to the upper edge.

20 Claims, 8 Drawing Sheets

(52) U.S. Cl.
CPC .......... *H04R 1/288* (2013.01); *H04R 2499/11* (2013.01); *H04R 2499/15* (2013.01)
(58) Field of Classification Search
CPC ..... H04R 2499/15; H04R 1/22; H04M 1/026; H04M 1/035
See application file for complete search history.

(56) References Cited

U.S. PATENT DOCUMENTS

| | | | |
|---|---|---|---|
| 7,869,617 B2 | 1/2011 | Jang et al. | |
| 9,820,034 B1* | 11/2017 | Zhang | H04R 1/288 |
| 9,918,161 B1* | 3/2018 | Chen | H04R 1/2803 |
| 10,440,470 B2 | 10/2019 | Park et al. | |
| 10,743,102 B2 | 8/2020 | Cho et al. | |
| 11,051,098 B2* | 6/2021 | Kim | H04R 1/2823 |
| 11,765,259 B2 | 9/2023 | Lee et al. | |
| 2013/0223655 A1* | 8/2013 | Lee | H04R 1/34 381/189 |
| 2019/0132670 A1* | 5/2019 | Qin | H04R 7/127 |
| 2020/0045408 A1* | 2/2020 | Wu | H04R 1/288 |
| 2020/0329303 A1* | 10/2020 | Sim | H04R 1/028 |
| 2021/0037312 A1* | 2/2021 | Cho | H04R 1/288 |
| 2021/0120343 A1* | 4/2021 | Zhang | H04R 9/02 |

FOREIGN PATENT DOCUMENTS

| | | |
|---|---|---|
| JP | 2016-213671 A | 12/2016 |
| KR | 10-2003-0021288 A | 3/2003 |
| KR | 10-1612791 B1 | 8/2011 |
| KR | 10-1776773 B1 | 9/2017 |
| KR | 10-2017-0119461 A | 10/2017 |
| KR | 10-2018-0092219 A | 8/2018 |
| KR | 10-2019-0075021 A | 6/2019 |
| KR | 10-2020-0085069 A | 7/2020 |

OTHER PUBLICATIONS

Korean Notice of Patent Grant with English translation dated Jul. 11, 2025; Korean Appln. No. 10-2021-0004253.

* cited by examiner

ELECTRONIC DEVICE INCLUDING PIPELINE STRUCTURE THROUGH WHICH SOUND PROPAGATES

CROSS-REFERENCE TO RELATED APPLICATION(S)

This application is a continuation application, claiming priority under § 365 (c), of an International application No. PCT/KR2022/000528, filed on Jan. 12, 2022, which is based on and claims the benefit of a Korean patent application number 10-2021-0004253, filed on Jan. 12, 2021, in the Korean Intellectual Property Office, the disclosure of which is incorporated by reference herein in its entirety.

TECHNICAL FIELD

The disclosure relates to an electronic device including a pipeline structure through which a sound propagates.

BACKGROUND ART

An electronic device such as a smart phone and the like. may include an upper speaker disposed at an upper end of the electronic device and a lower speaker disposed at a lower end of the electronic device. The upper speaker and the lower speaker may be configured to generate sound in stereo so as to secure acoustic performance. The upper speaker may have a radiation hole in a front direction of the electronic device, and the lower speaker may have a radiation hole in a side direction of the electronic device. To secure the performance of the upper speaker and the lower speaker, it may be necessary to secure the maximum width and breadth of a pipeline that is a path through which a sound is propagated. Also, when the maximum width and breadth of the pipeline are secured, the sound propagating through the pipeline may, without being distorted, be emitted out through the radiation hole.

The above information is presented as background information only to assist with an understanding of the disclosure. No determination has been made, and no assertion is made, as to whether any of the above might be applicable as prior art with regard to the disclosure.

DISCLOSURE

Technical Problem

A resonant frequency may be generated according to an internal shape of a pipeline corresponding to a path through which sound propagates, and a user may sensitively listen to the propagated sound at a band of 3 to 4 kHz according to the equal loudness contour. That is, when the resonant frequency is generated at the 3 to 4 kHz band, the user may also listen to a large amount of noise. Accordingly, when the user makes a call, an internal design of the pipeline for reducing the noise may be required.

As the width of the pipeline is reduced, the resonant frequency may be shifted due to a decrease of an internal volume and cross-sectional area of the pipeline. But, due to a decrease of a damping effect, sound pressure may increase compared to the existing pressure, and due to this, the user may more sensitively listen to a noise.

Aspects of the disclosure are to address at least the above-mentioned problems and/or disadvantages and to provide at least the advantages described below. Accordingly, an aspect of the disclosure is to provide an electronic device including a pipeline structure through which a sound propagates.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing including a front plate, a rear plate disposed to be spaced a predetermined distance apart from the front plate in parallel, and a side plate surrounding a space formed between the front plate and the rear plate, an opening disposed between an upper edge of the front plate and the side plate, a speaker including a sound radiation part in a direction of being directed toward the front plate and disposed inside the housing, a support member disposed to extend from the sound radiation part toward the upper edge of the front plate, and a pipeline including another space formed between the front plate and the support member. The pipeline may include a first structure disposed adjacent to the sound radiation part and a second structure disposed adjacent to the opening, and the second structure may be disposed to be spaced apart a predetermined length from the first structure in a direction of forming an acute angle with respect to a reference line orthogonal to the upper edge.

In accordance with another aspect of the disclosure, an electronic device is provided. The electronic device includes a housing including a front plate, a rear plate disposed to be spaced apart from the front plate by a predetermined distance in parallel, and a side plate surrounding a space formed between the front plate and the rear plate, an opening disposed between an upper edge of the front plate and the side plate, a speaker including a sound radiation part in a direction of being directed toward the front plate, and disposed inside the housing, a support member disposed to extend from the sound radiation part toward the upper edge of the front plate, and a pipeline including another space formed between the front plate and the support member. The pipeline may include at least one structure disposed on one surface of the support member, and a first structure among the at least one structure may be disposed adjacent to the sound radiation part.

Advantageous Effects

According to various embodiments disclosed in the disclosure, a noise generated during a call may shift a resonance frequency of a user sensitive audible band of 2 to 5 kHz, thereby decreasing a sound pressure in the band. Owing to the decreased sound pressure in the band, it is possible to reduce an amount of noise that the user hears during a call.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Figure 1:
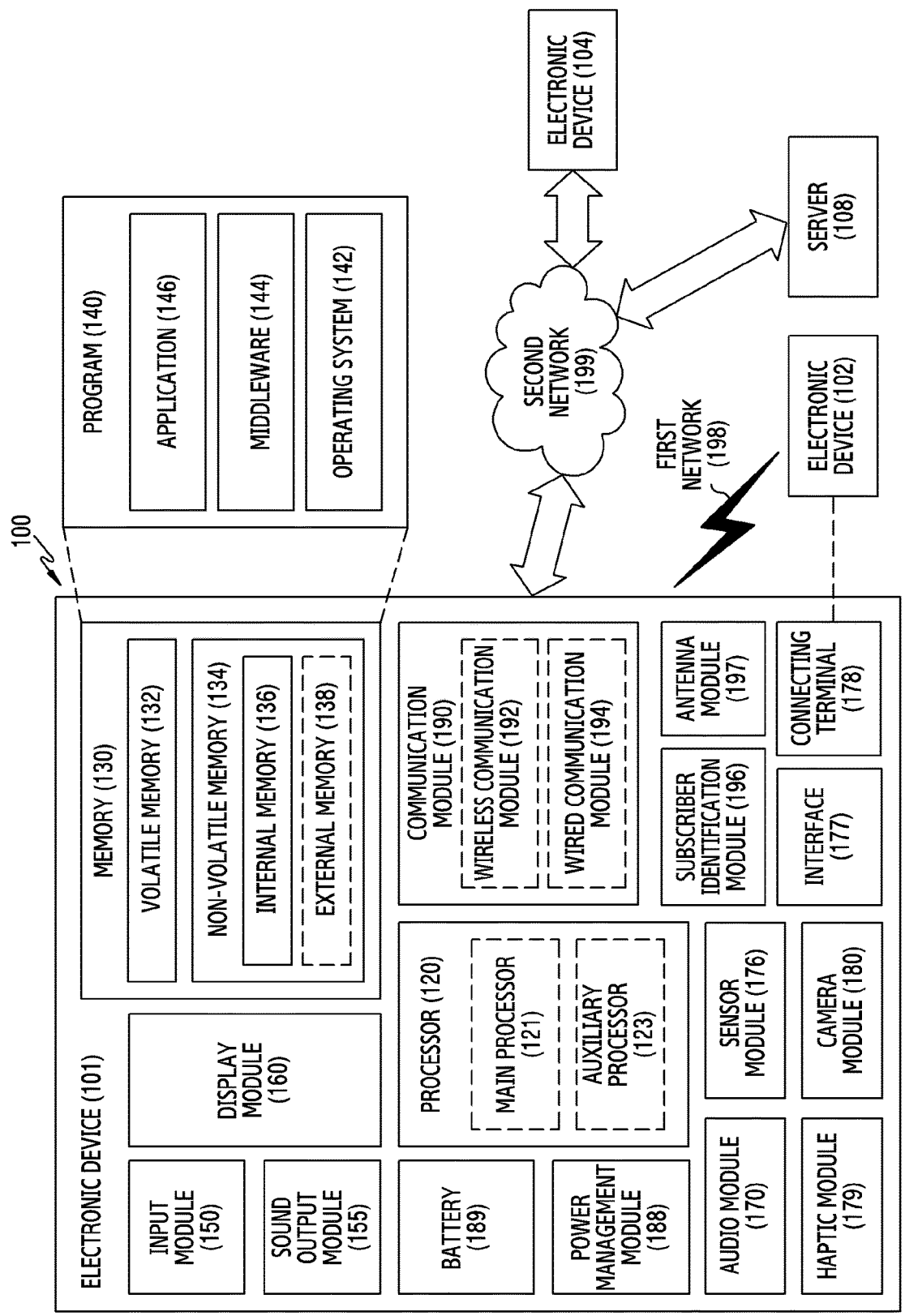
FIG. 1 illustrates a block diagram of an electronic device in a network environment according to an embodiment of the disclosure.

FIG. 1 illustrates a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In the following description, the same reference numerals will be used for all the same or similar components unless otherwise indicated. In addition, the description for the same reference numerals may be omitted.

Figure 2:
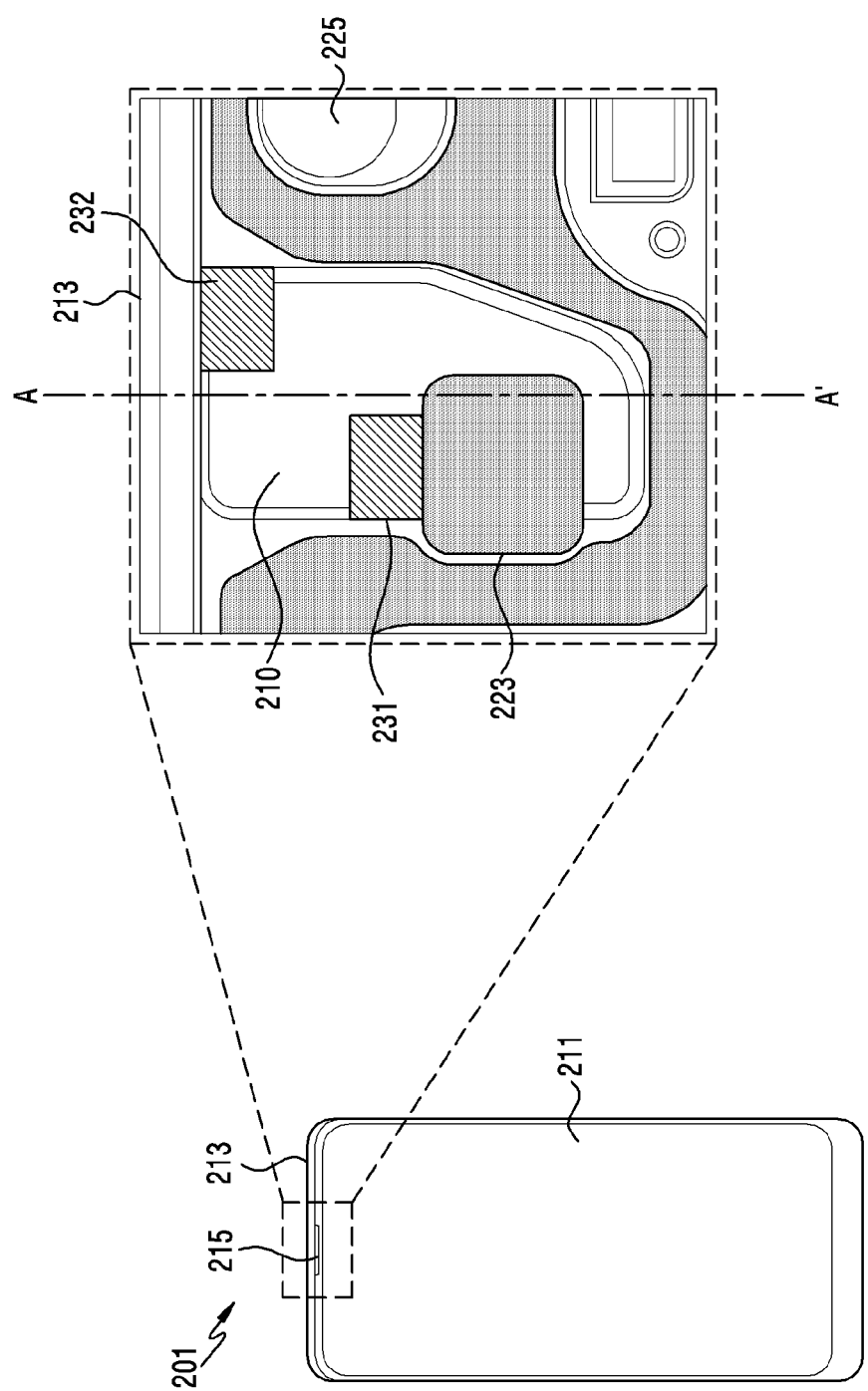
FIG. 2 illustrates an electronic device according to an embodiment of the disclosure.

FIG. 2 illustrates an electronic device according to an embodiment of the disclosure.

Referring to FIG. 2, an electronic device 201 may include a housing including a front plate 211, a side plate 213, and a rear plate (not shown), a speaker (not shown) disposed inside the housing, an opening 215 disposed between an upper edge of the front plate 211 and the side plate 213, and a pipeline 210 corresponding to a path through which a sound is propagated so as to allow the sound outputted from a camera 225 and a speaker (not shown) to be emitted to the outside of the electronic device 201 through a sound radiation part 223 and the opening 215. Constituent elements included in the electronic device 201 may not be limited to the constituent elements illustrated in FIG. 2. The constituent elements illustrated in FIG. 2 may be replaced with other constituent elements, or additional constituent elements may be added to the electronic device 201. For example, at least a portion of the content of the electronic device 101 of FIG. 1 may be applied to the electronic device 201 of FIG. 2. For another example, the electronic device 201 may further include a support member 311 illustrated in FIG. 3.

According to an embodiment, the electronic device 201 may include the front plate 211 being directed in a first direction corresponding to a front surface of the electronic device 201. The electronic device 201 may be directed in a second direction opposite to the first direction, and include the rear plate corresponding to a rear surface of the electronic device 201. The rear plate may be disposed to be spaced apart from the front plate 211 by a predetermined distance in parallel. The electronic device 201 may include the side plate 213 surrounding a space formed between the front plate 211 and the rear plate.

According to an embodiment, the electronic device 201 may include the speaker including the sound radiation part 223 in a direction of being directed toward the front plate 211.

According to an embodiment, the electronic device 201 may include the opening 215 disposed between the center of the upper edge of the front plate 211 and the side plate 213. A position of the opening 215 may not be limited to the form illustrated in FIGS. 2 and 3. For example, the opening 215 may be formed in one region of the front plate 211. The opening 215 may be formed at an upper end of the front plate 211. Although not illustrated in FIGS. 2 and 3, the electronic device 201 may include an opening formed at the upper end of the front plate 211.

According to an embodiment, the electronic device 201 may include the camera 225 which is spaced apart from the upper edge of the front plate 211 by a predetermined distance on a reference line passing through the center of the electronic device 201 and is disposed inside the housing. The speaker and the sound radiation part 223 may be disposed at a side of the camera 225. For example, the speaker and the sound radiation part 223 may be disposed at the left side or right side of the camera 225.

According to an embodiment, the pipeline 210 may include at least one structure. The pipeline 210 may include a first structure 231 and a second structure 232. Although not illustrated in FIG. 2, the pipeline 210 may further include a third structure. The first structure 231 may be disposed adjacent to the sound radiation part 223, and the second structure 232 may be disposed adjacent to the opening 215. The second structure 232 may be disposed to be spaced a predetermined length apart from the first structure 231 in a direction of forming an acute angle with respect to a reference line perpendicular to the upper edge. For example, the first structure 231 and the second structure 232 may form a mutual diagonal direction and may be disposed inside the pipeline 210.

According to an embodiment, a form of the at least one structure may include a rib form.

According to an embodiment, the housing may be made from a metal material, and members around the pipeline 210 forming the pipeline 210 may be made from an injection material. The first structure 231 and the second structure 232 may be made from an injection material or be made from a porous material. The porous material may include at least one of a sponge or a sound absorbing material. A density of the porous material may be less than 0.2 g/cm$^3$.

Figure 3:
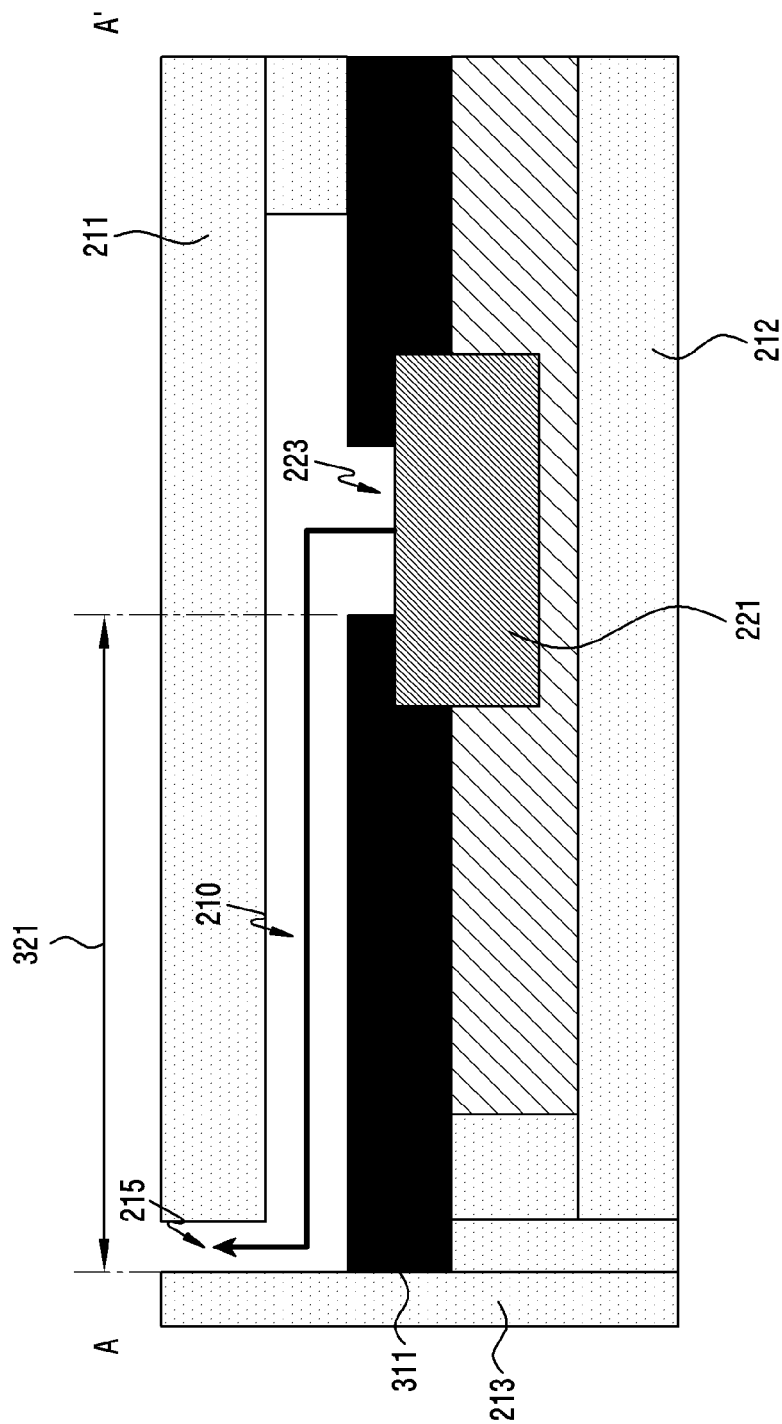
FIG. 3 is a cross-sectional view taken along line A-A' of FIG. 2 according to an embodiment of the disclosure.

FIG. 3 is a cross-sectional view taken along line A-A' of FIG. 2 according to an embodiment of the disclosure.

Referring to FIG. 3, the electronic device 201 may include the front plate 211, the rear plate 212, the side plate 213, the speaker 221, the sound radiation part 223, the opening 215, the pipeline 210, and the support member 311.

According to an embodiment, at least a partial region of the front plate 211 may be made from a transparent material (e.g., a glass). The opening 215 may be formed between the upper edge of the front plate 211 and the side plate 213. A sound outputted from the speaker 221 may be propagated along the inside of the pipeline 210 and be emitted to the outside of the electronic device 201 through the opening 215. An arrow shown in FIG. 3 may indicate a path along which the sound is propagated.

According to an embodiment, the speaker 221 may be disposed between the rear plate 212 and the support member 311. The support member 311 may perform a role of fixing the speaker 221 inside the housing.

According to an embodiment, the electronic device 201 may include a display (not shown). The display may be disposed on one surface of the front plate 211, and a screen outputted through the display may be displayed through a transparent region of the front plate 211.

According to an embodiment, the pipeline 210 may be formed by a space formed between the front plate 211 and the support member 311. The pipeline 210 may be formed by a space corresponding to a path through which a sound outputted from the speaker 221 is propagated through members around the pipeline 210 including the front plate 211 and the support member 311. The pipeline 210 may mean the path through which a sound outputted from the speaker 221 is propagated. Although not shown in FIG. 3, the pipeline 210 may include at least one structure. For example, the pipeline 210 may include the first structure 231 and the second structure 232. The at least one structure may be disposed on one surface of the support member 311. For example, the first structure 231 and the second structure 232 may be disposed on one surface of the support member 311. The one surface of the support member 311 on which the at least one structure is disposed may mean a surface forming the pipeline 210.

According to an embodiment, the at least one structure may be disposed in a space 321 between the sound radiation part 223 and the side plate 213. For example, the first structure 231 may be adjacent to the sound radiation part 223 and may be disposed on one surface of the support member 311, and the second structure 232 may be adjacent to the opening 215 or the side plate 213, and may be disposed on one surface of the support member 311. An end of a direction of the sound radiation part 223 among the space 321 between the sound radiation part 223 and the side plate 213 may mean an inlet surface, and an end of the direction of the opening 215 or the side plate 213 may mean an outlet surface.

According to an embodiment, a height of the at least one structure may be less than a length between the front plate 211 and the support member 311. For example, a height of the first structure 231 may correspond to a half of the length between the front plate 211 and the support member 311. A height of the first structure 231 and a height of the second structure 232 may be the same or different.

Figure 4A:
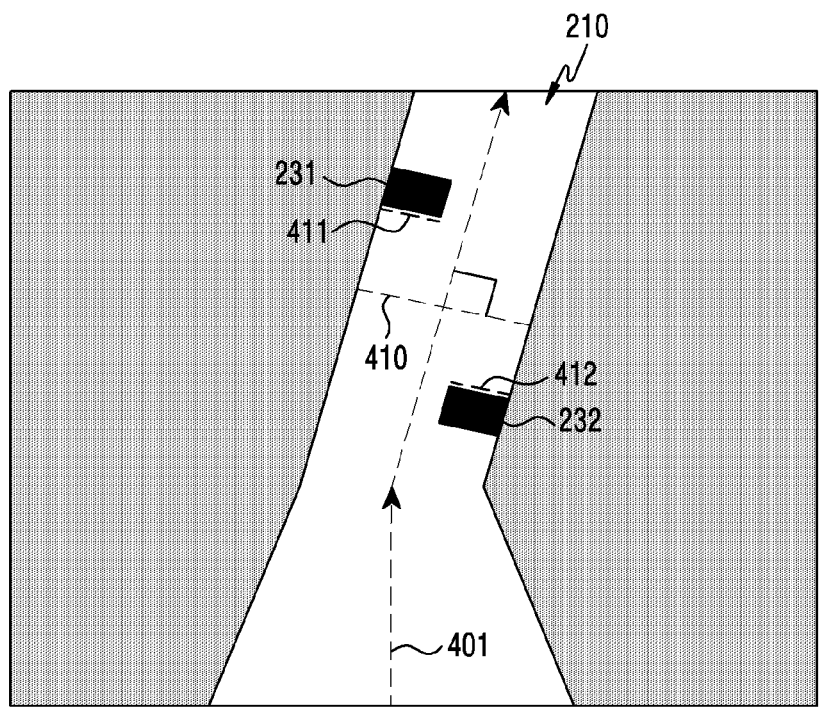
FIG. 4A illustrates a pipeline and a structure according to an embodiment of the disclosure.
Figure 4B:
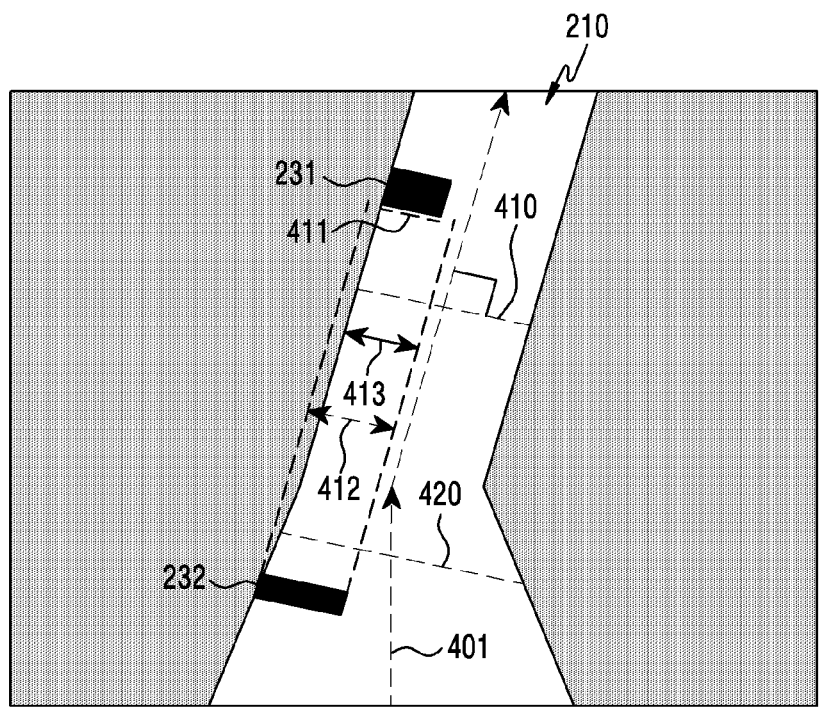
FIG. 4B illustrates a pipeline and a structure according to an embodiment of the disclosure.

FIGS. 4A and 4B illustrate the pipeline 210 and the structures 231 and 232 according to various embodiments of the disclosure.

Referring to FIG. 4A, the pipeline 210 may include at least one structure. For example, the pipeline 210 may include the first structure 231 and the second structure 232.

According to an embodiment, a size of a cross-sectional area of the at least one structure orthogonal to a direction 401 in which a sound outputted from the speaker 221 is propagated may be less than a size of a cross-sectional area 410 of the pipeline 210 orthogonal to the direction 401 in which the sound is propagated.

According to an embodiment, when a plurality of structures are included in the pipeline 210, a sum of sizes of cross-sectional areas of the plurality of structures orthogonal to the direction 401 in which the sound is propagated may be less than the size of the cross-sectional area 410 of the pipeline 210 orthogonal to the direction 401 in which the sound is propagated. For example, when a cross-section of the first structure 231 and a cross-section of the second structure 232 orthogonal to the sound propagation direction 401 are projected each in parallel to a surface orthogonal to the direction 401, when the cross-section of the first structure 231 and the cross-section of the second structure 232 do not overlap, a sum of a first size of a cross-sectional area 411 of the first structure 231 orthogonal to the direction 401 in which the sound is propagated and a second size of a cross-sectional areas 412 of the second structure 232 may be less than the size of the cross-sectional area 410 of the pipeline 210 orthogonal to the sound propagation direction 401.

Referring to FIG. 4B, when sizes of cross-sectional areas 410 and 420 of the pipeline 210 are not constant, the sizes of the cross-sectional areas 410 and 420 of the pipeline 210 compared with the sum of the sizes of the cross-sectional areas of the plurality of structures may be determined as the size of the cross-sectional area 410 corresponding to a minimum value among the sizes of the cross-sectional areas 410 and 420.

According to an embodiment, when the first structure 231 is disposed in a region where the size of the cross-sectional area 410 of the pipeline 210 is small, and the second structure 232 is disposed in a region where the size of the cross-sectional area 420 of the pipeline 210 is large, the cross-sectional area 411 of the first structure 231 and the cross-sectional area 413 of the second structure 232 may be determined based on the cross-sectional area 410 corresponding to a minimum value among the cross-sectional areas 410 and 420 of the pipeline 210. For example, the cross-sectional area of the second structure 232 may be determined as not a cross-sectional area 412 being based on the cross-sectional area 420 of the pipeline 210, but a cross-sectional area 413 being based on the cross-sectional area 410 of the pipeline 210.

According to an embodiment, when cross-sections of the plurality of structures orthogonal to the sound propagation direction 401 are projected each in parallel to the surface orthogonal to the direction 401, when the cross-sections of the plurality of structures orthogonal to the direction 401 are overlapped, a value obtained by differencing a size of the overlapped portion from the sum of the sizes of the cross-sectional areas of the plurality of structures orthogonal to the direction 401 may be less than the size of the cross-sectional area 410 of the pipeline 210. For example, when the cross-section of the first structure 231 and the cross-section of the second structure 232 orthogonal to the sound propagation direction 401 are projected each in parallel to the surface orthogonal to the direction 401, when the cross-section of the first structure 231 and the cross-section of the second structure 232 are overlapped, a value obtained by differencing the size of the overlapped portion from a sum of a first size of the cross-sectional area 411 of the first structure 231 and a second size of the cross-sectional area 413 of the second structure 232 orthogonal to the sound propagation direction 401 may be less than the size of the cross-sectional area 410 of the pipeline 210.

Figure 5:
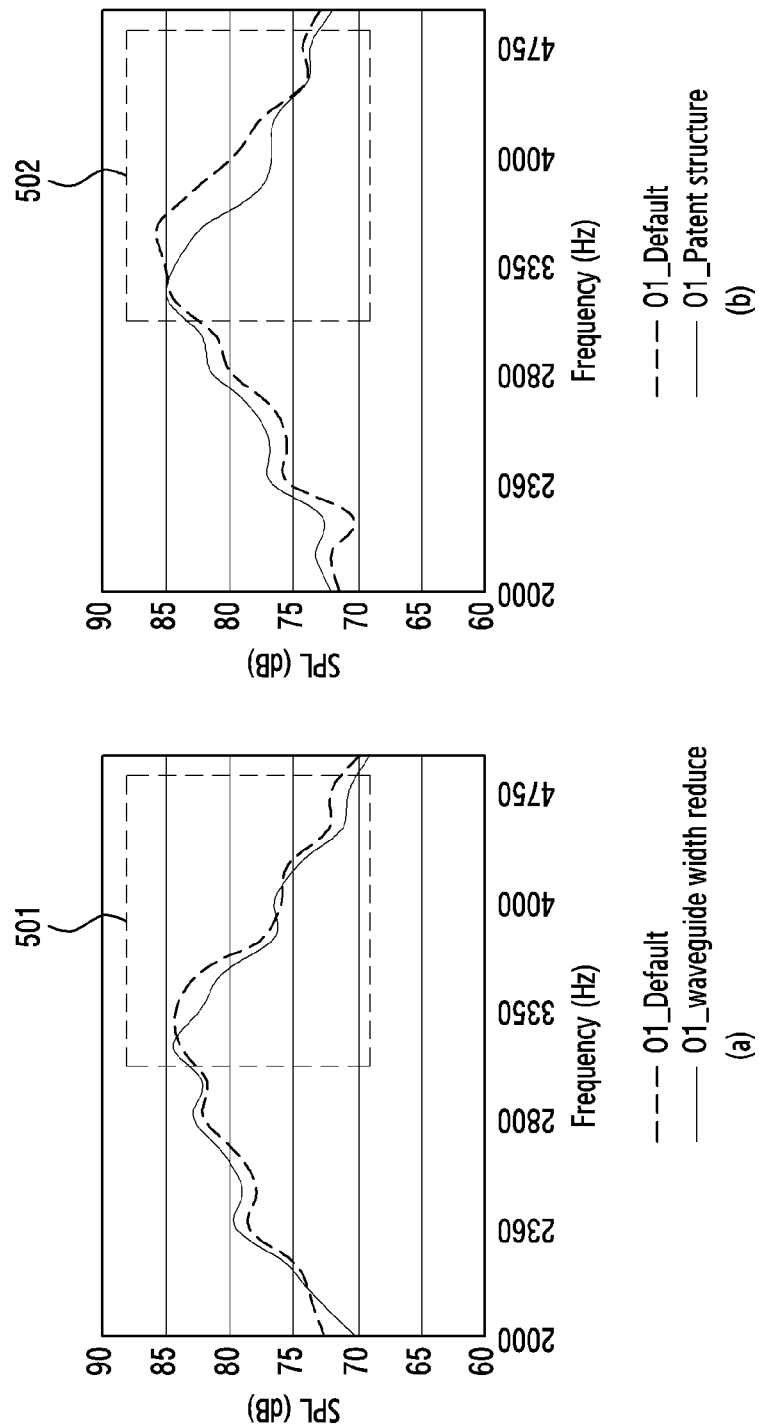
FIG. 5 illustrates a graph of an effect of a decrease of a sound pressure dependent on the arrangement of a structure according to an embodiment of the disclosure.

FIG. 5 illustrates a graph of an effect of a decrease of a sound pressure dependent on the arrangement of the structures 231 and 232 according to an embodiment of the disclosure.

In graphs shown in parts (a) and (b) of FIG. 5, an x-axis may be a frequency (Hz), and a y-axis may be a sound pressure (SPL (dB)).

Referring to the graph shown in part (a) of FIG. 5, when a width of the pipeline 210 is reduced (waveguide width reduce) compared to when the pipeline 210 does not include the at least one structure (default), a damping effect may be decreased and a sound pressure may be increased at a user sensitive audible band 501 (e.g., 3 to 4 kHz).

According to an embodiment, when a sound outputted from the speaker 221 is propagated along the pipeline 210, a resonant frequency may be provided at a specific frequency according to an internal shape of the pipeline 210. For example, the resonance frequency may be provided by a volume (V) of the pipeline 210, a cross-sectional area (A) of the pipeline 210, and a length (L) of the pipeline 210. By the Helmholtz resonator formula-Equation 1, the resonant frequency may be inversely proportional to the volume (V) and length (L), and may be proportional to a size of the cross-sectional area (A).

$$\left\{ \text{QUOTE } f = \frac{v}{2\pi}\sqrt{\frac{A}{VL}} \right\} \text{ ($v$ is a speed of sound)} \quad \text{Equation 1}$$

According to an embodiment, when the resonant frequency is formed at 3 to 4 kHz, when a sound of the same level is applied, a user may sensitively listen to a sound by the equal loudness contour. For example, when the resonance frequency is formed at 3 to 4 kHz, an amount of noise that the user listens to during a call reception may be large.

Referring to the graph shown in part (b) of FIG. 5, when the pipeline 210 includes the at least one structure (502) (e.g., 3 to 4 kHz). For example, when the pipeline 210 includes the at least one structure compared to when the pipeline 210 does not include the at least one structure, a sound pressure of about-3 dB may be decreased at 3.5 to 5 kHz that is a user sensitive audible band.

Figure 6A:
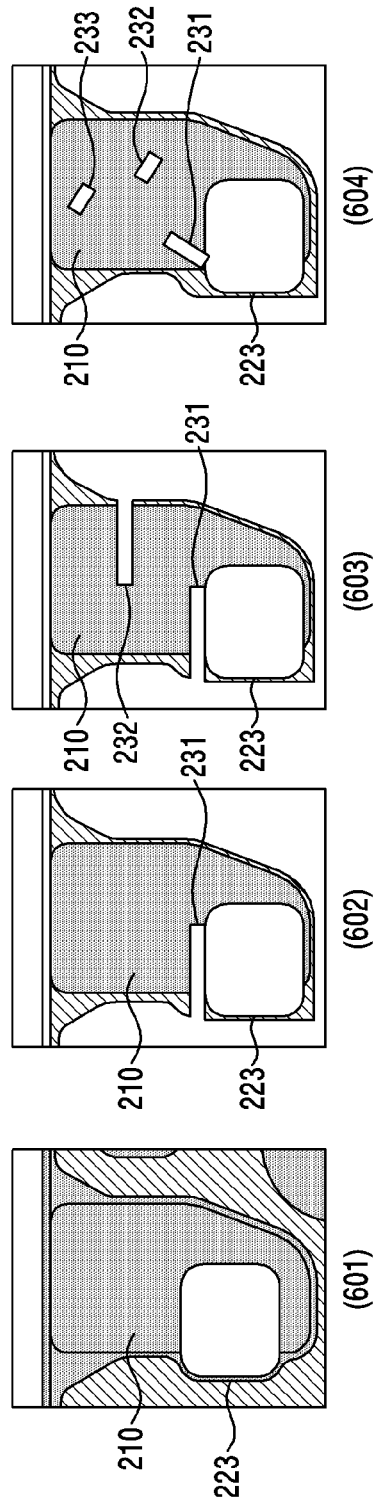
FIG. 6A illustrates various arrangement of a structure according to an embodiment of the disclosure.

FIG. 6A illustrates various arrangements of structures according to an embodiment of the disclosure.

Figure 6B:
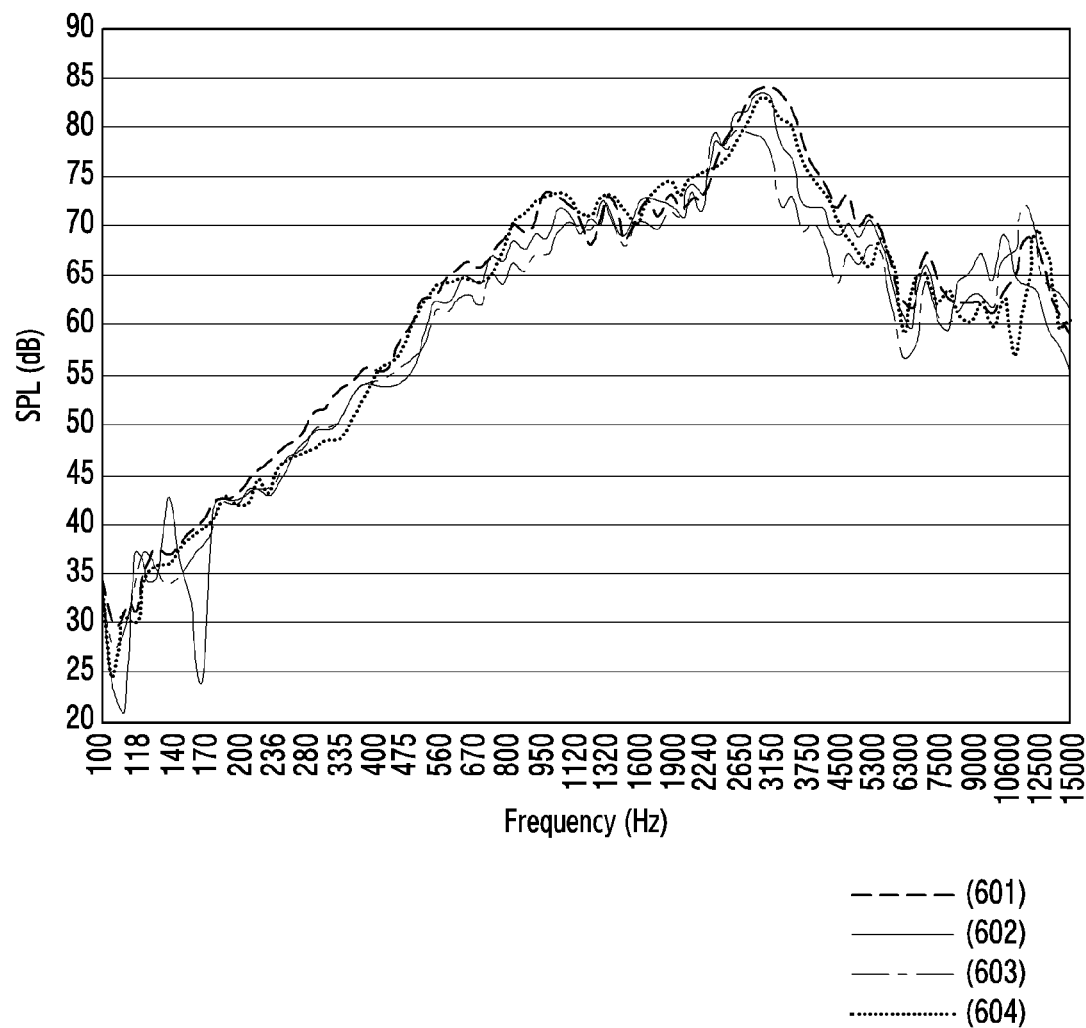
FIG. 6B illustrates a graph of an effect of a decrease of a sound pressure dependent on various arrangement of a structure according to an embodiment of the disclosure.

FIG. 6B illustrates a graph of an effect of a decrease of a sound pressure dependent on various arrangement of the structures according to an embodiment of the disclosure.

Referring to FIG. 6A, reference numeral 601 denotes a pipeline 210 not including at least one structure, and reference numeral 602 denotes a pipeline 210 including a first structure 231, and reference numeral 603 denotes a pipeline 210 including a first structure 231 and a second structure 232, and reference numeral 604 denotes a pipeline 210 including a first structure 231, a second structure 232, and a third structure 233.

The pipeline 210 denoted by reference numeral 601 may be understood as a comparative group compared with the pipeline 210 of various embodiments disclosed in the disclosure, for example, the pipeline 210 including the at least one structure denoted by reference numerals 602 to 604.

Referring to reference numeral 602, the electronic device 201 may include the pipeline 210 including the first structure 231. The first structure 231 may be disposed adjacent to the sound radiation part 223.

Referring to reference numeral 603, the electronic device 201 may include the first structure 231 and the second structure 232. The first structure 231 may be disposed adjacent to the sound radiation part 223. The second structure 232 may be disposed adjacent to the opening 215 or the side plate 213. The second structure 232 may be disposed to be spaced a predetermined length apart from the first structure 231 in a direction of forming an acute angle with respect to a reference line perpendicular to the upper edge of the front plate 211. A width of the first structure 231 and a width of the second structure 232 may be the same or different. The width may mean a length of a direction of the upper edge.

Referring to reference numeral 604, the electronic device 201 may include the first structure 231, the second structure 232, and the third structure 233. The first structure 231, the second structure 232, and the third structure 233 may be disposed in any position inside the pipeline 210. Reference numeral 604 illustrates a state in which at least one structure disposed inside the pipeline 210 is disposed, but may not be limited thereto.

In the graph shown in FIG. 6B, an x-axis may be a frequency (Hz), and a y-axis may be a sound pressure (SPL (dB)).

Referring to FIG. 6B, the sound pressure dependent on the frequency may be different according to the pipeline 210 denoted by reference numerals 601 to 604. For example, in 3 to 5 kHz which is a user sensitive audible band, a sound pressure of a propagating sound tends to decrease in order of the pipeline 210 denoted by reference numeral 601 of FIG. 6A, the pipeline 210 denoted by reference numeral 602, and the pipeline 210 denoted by reference numeral 603, and a sound pressure of a sound propagated in the pipeline 210 denoted by reference numeral 604 may be between a sound pressure of a sound propagated in the pipeline 210 denoted by reference numeral 601 and a sound pressure of a sound propagated in the pipeline 210 denoted by reference numeral 602.

According to an embodiment, the electronic device 201 may include the housing including the front plate 211, the rear plate 212 disposed to be spaced a predetermined distance apart from the front plate 211 in parallel, and the side plate 213 surrounding a space formed between the front plate 211 and the rear plate 212, the opening 215 disposed between an upper edge of the front plate 211 and the side plate 213, the speaker 221 including the sound radiation part 223 in a direction of being directed toward the front plate 211 and disposed inside the housing, the support member 311 disposed to extend from the sound radiation part 223 toward the upper edge of the front plate 211, and the pipeline 210 including a space formed between the front plate 211 and the support member 311. The pipeline 210 may include the first structure 231 disposed adjacent to the sound radiation part 223 and the second structure 232 disposed adjacent to the opening 215, and the second structure 232 may be disposed to be spaced a predetermined length apart from the first structure 231 in a direction of forming an acute angle with respect to a reference line orthogonal to the upper edge.

According to an embodiment, the first structure 231 and the second structure 232 may be disposed on one surface of the support member 311.

According to an embodiment, the first structure 231 and the second structure 232 may be disposed between the sound radiation part 223 and the side plate 213.

According to an embodiment, the form of the first structure 231 and the second structure 232 may include a rib form.

According to an embodiment, a sum of a first size of a cross-sectional area of the first structure 231 and a second size of a cross-sectional area of the second structure 232 orthogonal to a direction in which a sound outputted from the speaker 221 is propagated may be less than a size of a cross-sectional area of the pipeline 210 orthogonal to the direction.

According to an embodiment, when the size of the cross-sectional area of the pipeline 210 is not constant, the size of the cross-sectional area of the pipeline 210 may correspond to the minimum value among the sizes of the cross-sectional areas.

According to an embodiment, when a cross-section of the first structure 231 and a cross-section of the second structure 232 orthogonal to the direction are projected each in parallel to a surface orthogonal to the direction, a value obtained by differencing a size of a portion where the cross-section of the first structure 231 and the cross-section of the second structure 232 are overlapped from the sum of the first size and the second size may be less than the size of the cross-sectional area of the pipeline 210.

According to an embodiment, a height of the first structure 231 and a height of the second structure 232 may be less than a length between the support member 311 and the front plate 211.

According to an embodiment, the housing may be made from a metal material, and members around the pipeline 210 forming the pipeline 210 may be made from an injection material.

According to an embodiment, the first structure 231 and the second structure 232 may be made from an injection material.

According to an embodiment, the material of the first structure 231 and the second structure 232 may include a material that is the same as or different from the material of the peripheral member forming the pipeline 210.

According to an embodiment, the members around the pipeline 210 forming the pipeline 210 may be made from an injection material, and the first structure 231 and the second structure 232 may be made from a porous material.

According to an embodiment, the porous material may include at least one of a sponge and a sound absorbing material.

According to an embodiment, a density of the porous material may be less than 0.2 $g/cm^3$.

According to an embodiment, it may further include the camera 225 that is spaced a predetermined distance apart from the upper edge of the front plate 211 and disposed inside a housing, on a reference line passing through the center of the electronic device 201, and the speaker 221 and the sound radiation part 223 may be disposed at a side of the camera 225.

According to an embodiment, the electronic device 201 may include the housing including the front plate 211, the rear plate 212 disposed to be spaced a predetermined distance apart from the front plate 211 in parallel, and the side plate 213 surrounding a space formed between the front plate 211 and the rear plate 212, the opening 215 disposed between an upper edge of the front plate 211 and the side plate 213, the speaker 221 including the sound radiation part 223 in a direction of being directed toward the front plate 211, and disposed inside the housing, the support member 311 disposed to extend from the sound radiation part toward the upper edge of the front plate 211, and the pipeline 210 including a space formed between the front plate 211 and the support member 311. The pipeline 210 may include at least one structure disposed on one surface of the support member 311, and the first structure 231 among the at least one structure may be disposed adjacent to the sound radiation part 223.

According to an embodiment, the first structure 231 may be disposed between the sound radiation part 223 and the side plate 213.

According to an embodiment, a first size of a cross-sectional area of the first structure 231 orthogonal to a direction in which a sound outputted from the speaker 221 is propagated may be less than a size of a cross-sectional area of the pipeline 210 orthogonal to the direction.

According to an embodiment, when the size of the cross-sectional area of the pipeline 210 is not constant, the size of the cross-sectional area of the pipeline 210 may correspond to the minimum value among the size of the cross-sectional area.

According to an embodiment, a height of the first structure 231 may be less than a length between the support member 311 and the front plate 211.

An effect obtainable from the disclosure is not limited to the above-mentioned effects, and other effects not mentioned would be able to be apparently understood from the following statement by a person having ordinary skill in the art to which the disclosure pertains.

Methods of embodiments mentioned in the claims or specification of the disclosure may be implemented in the form of hardware, software, or a combination of hardware and software.

In response to being implemented by software, a computer-readable storage media storing one or more programs (software modules) may be presented. The one or more programs stored in the computer-readable storage media are configured to be executable by one or more processors within an electronic device. The one or more programs include instructions for enabling the electronic device to execute the methods of the embodiments stated in the claims or specification of the disclosure.

These programs (software modules and/or software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), digital versatile discs (DVDs), an optical storage device of another form, and/or a magnetic cassette. Or, the programs may be stored in a memory that is constructed in combination of some, or all, of them. Also, each constructed memory may be included in the plural as well.

Also, the program may be stored in an attachable storage device that may access through a communication network such as the Internet, an intranet, a local area network (LAN), a wide area network (WAN), or a storage area network (SAN), or a communication network consisting of a combination of them. This storage device may be connected to a device performing an embodiment of the disclosure via an external port. Also, a separate storage device on the communication network may be connected to the device performing the embodiment of the disclosure as well.

In the aforementioned concrete embodiments of the disclosure, a constituent element included in the disclosure has been expressed in a singular form or a plural form according to a proposed concrete embodiment. But, the expression of the singular form or plural form is selected suitable to a given situation for description convenience's sake, and the disclosure is not limited to singular or plural constituent elements. Even if a constituent element is expressed in the plural form, the constituent element may be constructed in the singular form, or even if a constituent element is expressed in the singular form, the constituent element may be constructed in the plural form.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a housing comprising:
a front plate,
a rear plate disposed to be spaced a predetermined distance apart from the front plate in parallel, and
a side plate surrounding a space formed between the front plate and the rear plate;
an opening disposed between an upper edge of the front plate and the side plate;
a speaker comprising a sound radiation part in a direction of being directed toward the front plate and disposed inside the housing;
a support member disposed to extend from the sound radiation part toward the upper edge of the front plate; and
a pipeline comprising another space formed between the front plate and the support member,
wherein the pipeline comprises a first structure disposed adjacent to the sound radiation part and a second structure disposed adjacent to the opening, and
wherein the second structure is disposed to be spaced apart a predetermined length from the first structure in a direction of forming an acute angle with respect to a reference line orthogonal to the upper edge.

2. The electronic device of claim 1, wherein the first structure and the second structure are disposed in one surface of the support member.

3. The electronic device of claim 1, wherein the first structure and the second structure are disposed between the sound radiation part and the side plate.

4. The electronic device of claim 1, wherein the first structure and the second structure are formed in a shape of a rib.

5. The electronic device of claim 1, wherein a sum of a first size of a cross-sectional area of the first structure and a second size of a cross-sectional area of the second structure orthogonal to a direction in which a sound outputted from the speaker propagates is less than a size of a cross-sectional area of the pipeline orthogonal to the direction.

6. The electronic device of claim 5, wherein, when the size of the cross-sectional area of the pipeline is not constant, the size of the cross-sectional area of the pipeline corresponds to a minimum value among the sizes of the cross-sectional areas.

7. The electronic device of claim 5, wherein, when a cross-section of the first structure and a cross-section of the second structure orthogonal to the direction are projected respectively in parallel to a surface orthogonal to the direction, a value of differencing a size of a portion where a cross-section of the first structure and a cross-section of the second structure are overlapped in a sum of the first size and the second size of the first structure is less than the size of the cross-sectional area of the pipeline.

8. The electronic device of claim 1, wherein a height of the first structure and a height of the second structure are less than a length between the support member and the front plate.

9. The electronic device of claim 1,
wherein the housing is made from a metal material, and
wherein members around the pipeline forming the pipeline are made from an injection material.

10. The electronic device of claim 1, wherein the first structure and the second structure are made from an injection material.

11. The electronic device of claim 1, wherein a material of the first structure and the second structure comprises the same or different material from a material of a peripheral member forming the pipeline.

12. The electronic device of claim 11,
wherein the members around the pipeline forming the pipeline are made from an injection material, and
wherein the first structure and the second structure are made from a porous material.

13. The electronic device of claim 12, wherein the porous material comprises at least one of a sponge or a sound absorbing material.

14. The electronic device of claim 13, wherein a density of the porous material is less than 0.2 g/cm$^3$.

15. The electronic device of claim 1, further comprising a camera spaced a predetermined distance apart from the upper edge of the front plate and disposed inside the housing, on the reference line passing through the center of the electronic device,
wherein the speaker and the sound radiation part are disposed at a side of the camera.

16. An electronic device comprising:
a housing comprising:
a front portion including a display, a rear portion disposed to be spaced apart from the front portion by a predetermined distance in parallel, and a side portion surrounding a space formed between the front portion and the rear portion;

an opening disposed between an upper edge of the front portion and the side portion;

a speaker comprising a sound radiation part in a direction of being directed toward the front portion, and disposed inside the housing;

a support member disposed to extend from the sound radiation part toward the upper edge of the front portion and including a first side at which the front portion is disposed and a second side at which the speaker is disposed; and a sound passage formed by at least a portion of the support member and a portion of the display, between the sound radiation part and the opening, wherein at least one structure is disposed in the sound passage to partially block a cross-sectional area of the sound passage, and wherein a first structure among the at least one structure is disposed adjacent to the sound radiation part.

17. The electronic device of claim 16, wherein the first structure is disposed between the sound radiation part and the side portion.

18. The electronic device of claim 16, wherein a first size of a cross-sectional area of the first structure orthogonal to a direction in which a sound outputted from the speaker propagates is less than a size of the cross-sectional area of the sound passage orthogonal to the direction.

19. The electronic device of claim 18, wherein when the size of the cross-sectional area of the sound passage is not constant, the size of the cross-sectional area of the sound passage corresponds to a minimum value among the sizes of the cross-sectional area.

20. The electronic device of claim 16, wherein a height of the first structure is less than a length between the support member and the front portion.

* * * * *